Figure 1:
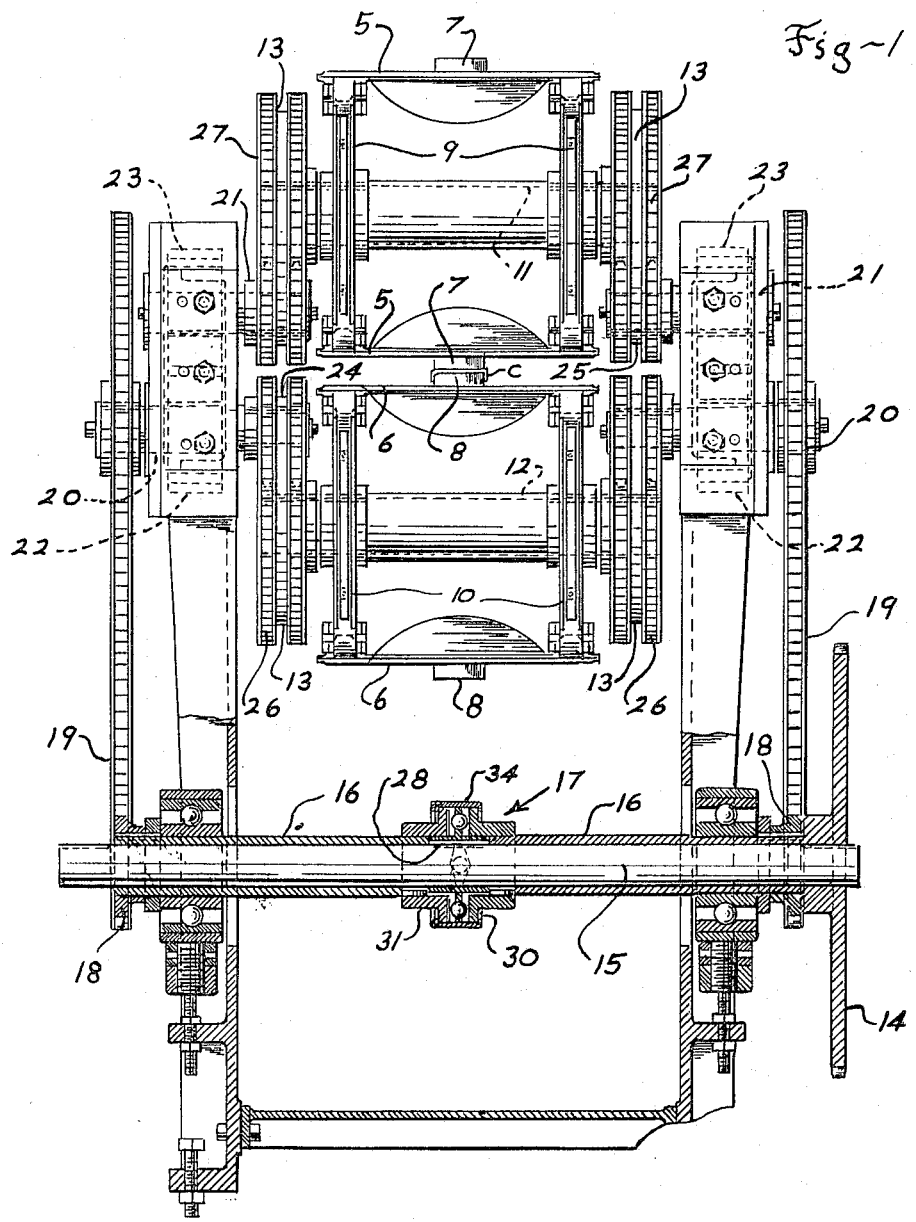

Feb. 14, 1967 LE ROY R. BOGGS 3,303,722
LIMITED DIFFERENTIAL TRANSMISSION
Original Filed Sept. 18, 1961 2 Sheets-Sheet 1

INVENTOR
LeRoy R. Boggs
BY
ATTORNEYS

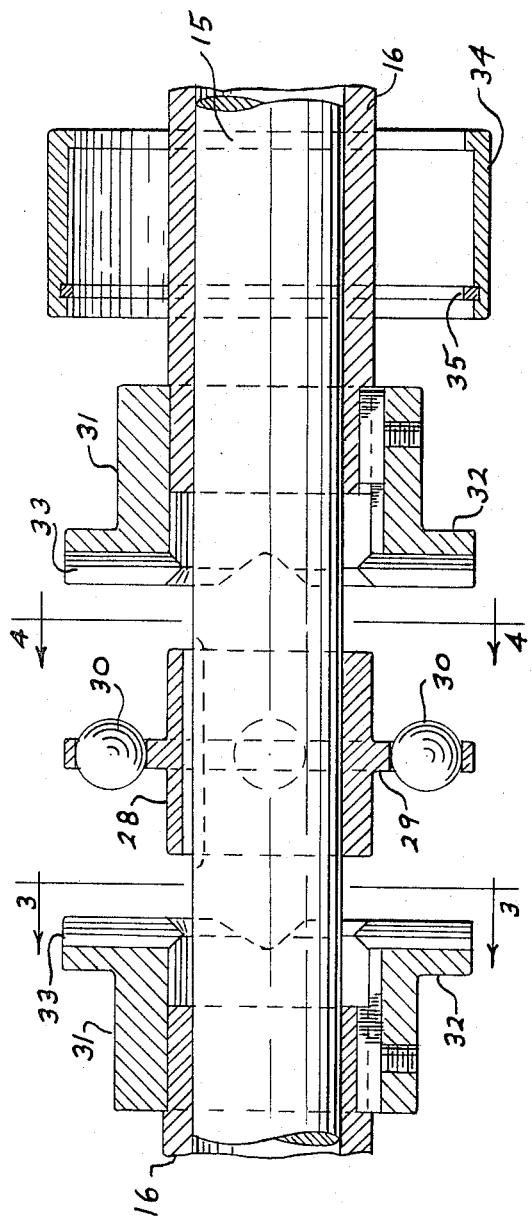
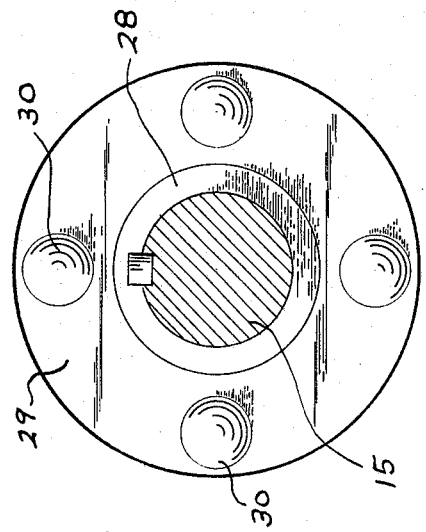
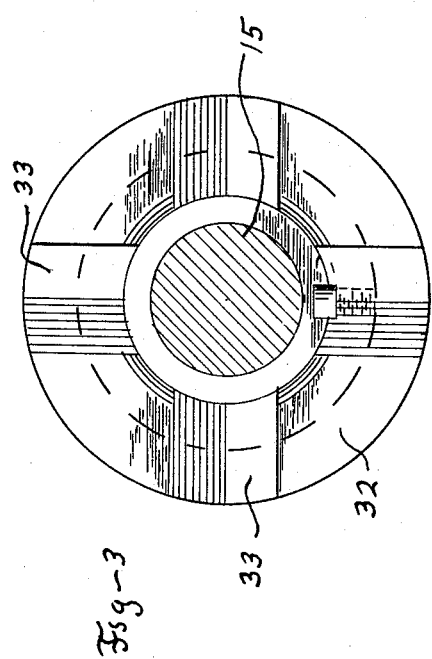

United States Patent Office 3,303,722
Patented Feb. 14, 1967

3,303,722
LIMITED DIFFERENTIAL TRANSMISSION
Le Roy R. Boggs, Bristol, Tenn., assignor to Universal Moulded Fiber Glass Corp., Bristol, Va., a corporation of Delaware
Original application Sept. 18, 1961, Ser. No. 142,749, now Patent No. 3,151,354, dated Oct. 6, 1964. Divided and this application Dec. 17, 1963, Ser. No. 331,272
1 Claim. (Cl. 74—650)

This is a division of application Serial No. 142,749, filed September 18, 1961, now Patent No. 3,151,354.

This invention relates to drive transmission mechanism and is especially concerned with a mechanism adapted for use in a transmission system for delivering power from a source through two drive trains to a common drive device.

For example, in certain equipment requiring the transmission of large amounts of power, the power to be transmitted to the driven device is divided between two parallel drive trains, such as gears or chains so that each train will be required to transmit only one half of the total power.

Because of the practical impossibility of forming two separate drive trains including gearing, sprockets, chains and the like with exact accuracy, if such two drive trains are both "solidly" connected both with the initial power shaft and with the driven device, one or the other of the drive trains would assume most if not all of the load, and the very purpose of providing two drive trains would be defeated.

According to the invention the load or torque carried in each of the two separate drive trains is equalized by the introduction of a novel mechanism providing automatically for compensation for irregularities or wear in the drive trains. In the preferred embodiment this is accomplished by introducing a device in the nature of a limited differential either between the main power shaft and the initial elements of the two separate drive trains, or between the last elements of the two separate drive trains and the driven device.

The invention provides a device for the above purpose which is exceedingly simple in construction and rugged in operation.

The present application as mentioned above is a division of application Serial No. 142,749, now Patent No. 3,151,354, in which the mechanism of the present invention is disclosed as embodied in a puller mechanism for pulling fiber reinforced resin articles through and from a forming device.

How the foregoing objects and advantages are attained will be clear from the following description referring to the accompanying drawings which illustrate a preferred embodiment of the invention and in which:

FIGURE 1 is an elevational view, with various parts in vertical section illustrating the use of the device of the invention in a puller mechanism as also disclosed in my copending application above identified;

FIGURE 2 is an exploded view of various parts of the device of the invention; and FIGURES 3 and 4 are views of certain parts taken as indicated by the section lines 3—3 and 4—4 on FIGURE 2.

It is not necessary herein to consider all the details of the mechanism in association with which the device of the invention is illustrated in FIGURE 1, but certain major parts of the arrangement are here briefly described in order to clarify the mode of use of the device of the invention. Details may be secured by reference to my copending application above identified.

First note that the section of FIGURE 1 is taken vertically and transversely through a pair of cooperating crawler tread devices having tread shoes 5 and 6 interlinked in closed circuits and carrying blocks 7 and 8 for gripping and pulling a fiber reinforced resin article being formed, such as the channel member C.

The tread shoes 5 and 6 and the interlinking parts are carried by pairs of sprockets 9—9 and 10—10 each pair being connected with a common drive shaft 11 or 12.

The sprocket shafts 11 and 12 are each adapted to be driven at both ends by means of separate drive trains, which in the embodiment shown include multiple chain sprockets 13, one such multiple chain sprocket being arranged at each end of each shaft, as seen in FIGURE 1.

Large diameter sprocket 14 is adapted to receive power from a motor or any other suitable source and deliver such power to the shaft 15. Power is delivered from the power shaft 15 to each of two sleeves 16 surrounding the shaft 15 by means of the drive device of the present invention which is indicated generally in FIGURE 1 by the numeral 17, this drive device being shown in greater detail in FIGURES 2, 3 and 4, later to be described.

With further reference to FIGURE 1, each sleeve 16 comprises the initial drive element of a separate drive train extended therefrom to shaft 11 or to shaft 12 to which the tread driving sprockets 9 and 10 are keyed. The arrangement provides two separate drive trains in order to enable delivery of very substantial drive loads or torque. Each drive sleeve 16 carries a driving sprocket 18 which is coupled by means of chain 19 with a sprocket mounted on a counter shaft 20, these parts providing for drive of the lower tread mechanism. Counter shafts 20 are geared to counter shafts 21 for the upper tread mechanism by means of pinions 22 and 23, so that shafts 20 and 21 rotate in one to one ratio but in opposite directions. Each of the shafts 20 and 21 carries multiple chain sprockets 24 and 25 which are connected by chains 26 and 27 with the multiple sprockets 13 above mentioned and which are connected with the outer ends of the sprocket shafts 11 and 12 to which the sprockets 9 and 10 are keyed for delivery of the power to the tread devices.

In this way the shafts 11 and 12 for the two tread devices are each driven through separate or independent drive trains, one being driven in one direction and the other in the opposite direction, so that the two crawler treads will be driven or advanced in the proper sense to exert the desired pull on the article being made.

As hereinabove mentioned the drive device of the invention is indicated generally by the number 17 in FIGURE 1. This device is shown in greater detail in FIGURES 2, 3 and 4 and reference is now made to those figures. The main power shaft 15 carries a sleeve 28 keyed thereto and having a flange 29 with apertures therein serving as a ball cage or race. A series of balls 30, (four being here shown) are arranged in this race. At opposite sides of the unit, each of the power sleeves 16 carries a collar 31 having a flange 32 in the face of which four sockets or radial grooves 33 are formed, one adapted to cooperate with each of the balls 30. These parts are shown in exploded arrangement in FIGURE 2, and when the parts are brought together as in FIGURE 1, each of the balls 30 in effect is adapted to work in a cavity formed by the grooves or sockets 33, there being space or clearance between the walls of the grooves 33 and the balls 30. The parts are adapted to be retained in assembled relation by means of a sleeve 34 having a snap ring 35 as will be understood from inspection of FIGURES 1 and 2.

In operation the balls 30 adjust themselves into positions displaced somewhat toward one side or the other of the mean plane of the ball race 29 according to the relative angular adjustment which the power sleeve 16 and the parts 31, 32 and 33 assume in order to transmit the driving torque or force through the respective drive trains to the sprocket shafts 11 and 12.

In operating in this manner, the balls tend to spread or separate the socketed flanges 32, but as those flanges are received in and engaged by the retainer sleeve 34, the separating thrust is carried by that sleeve directly from one flange 32 to the other.

The arrangement described above comprises in effect a limited differential, i.e., a differential in which limited relative motion is permitted between the two driven sleeves or parts. I have found that with a device of the type shown relative adjustment in the position of the driving parts such as the power sleeve 16 of one drive train with respect to the other, through an angle of something of the order of 10 or 15 degrees may readily take place so as to accommodate any initial inaccuracy or any irregular wear which may develop in the two separate drive trains. Thus at all times the torque delivered through the two drive trains remains the same, notwithstanding the use of two drive trains from the power source to the driven device.

Although the device of the invention will not function in the manner of the usual full differential, nevertheless for certain drive equalization purposes (such as that in which the invention is herein illustrated), the full differential action is not needed. The device of the present vention however is highly effective for the limited differential action described and accomplishes that purpose without resort to the much more complicated structure required for full differential action.

It is here noted that in the illustrative use of the device of the invention as herein disclosed the device is disposed in the drive system between the power shaft 15 and the initial elements 16 of the two separate drive trains which are extended to the driven elements 11 and 12. As already noted the arrangement may be inverted, thereby placing the device of the invention between the last elements of the two separate drive trains and the commonly driven elements or devices, and the claim herein is intended to comprehend such mere inversion.

I claim:

A differential for use in a power transmitting device of the kind having a power shaft and two driving trains for receiving and transmitting power from said shaft, the power transmitting connection of said trains to said shaft including differential driving mechanism comprising a ball race connected with the shaft, balls in said race exposed at both sides of said race axially of the shaft, and a pair of driving parts connected respectively with said two driving trains and having a pair of opposed sockets for each ball in said race, said driving parts being rotative about the same axis as the shaft, each pair of opposed sockets having two opposed driving surfaces, one of said opposed driving surfaces being on each of said driving parts, said pair of sockets being large enough in relation to the diameter of the balls so that said driving surfaces are the only portions of said driving parts against which the ball therein abuts during transmission of power from the ball race to the driving parts, said race and driving parts being constructed and arranged to permit relative motion, axially of the shaft, between the balls and the driving parts, the diameter of the balls and the spacing of said opposed surfaces being interrelated so as to permit limited relative rotation of said driving parts while maintaining power transmission from the ball race through said opposed surfaces to the driving parts.

References Cited by the Examiner

UNITED STATES PATENTS

| | | | |
|---|---|---|---|
| 1,282,614 | 10/1918 | Miller | 74—650 |
| 2,870,615 | 1/1959 | Walk | 64—19 |
| 2,932,381 | 4/1960 | Kinnicutt et al. | 64—19 |
| 3,111,043 | 11/1963 | Panhard | 74—650 |
| 3,130,604 | 4/1964 | Johnson et al. | 74—650 |

FOREIGN PATENTS 12,080    1910    Great Britain.

DAVID J. WILLIAMOWSKY, *Primary Examiner.*

DON A. WAITE, *Examiner.*

J. A. WONG, *Assistant Examiner.*